April 24, 1945.   F. R. BALCAR   2,374,405
PRODUCTION OF BUTADIENE
Filed June 25, 1943
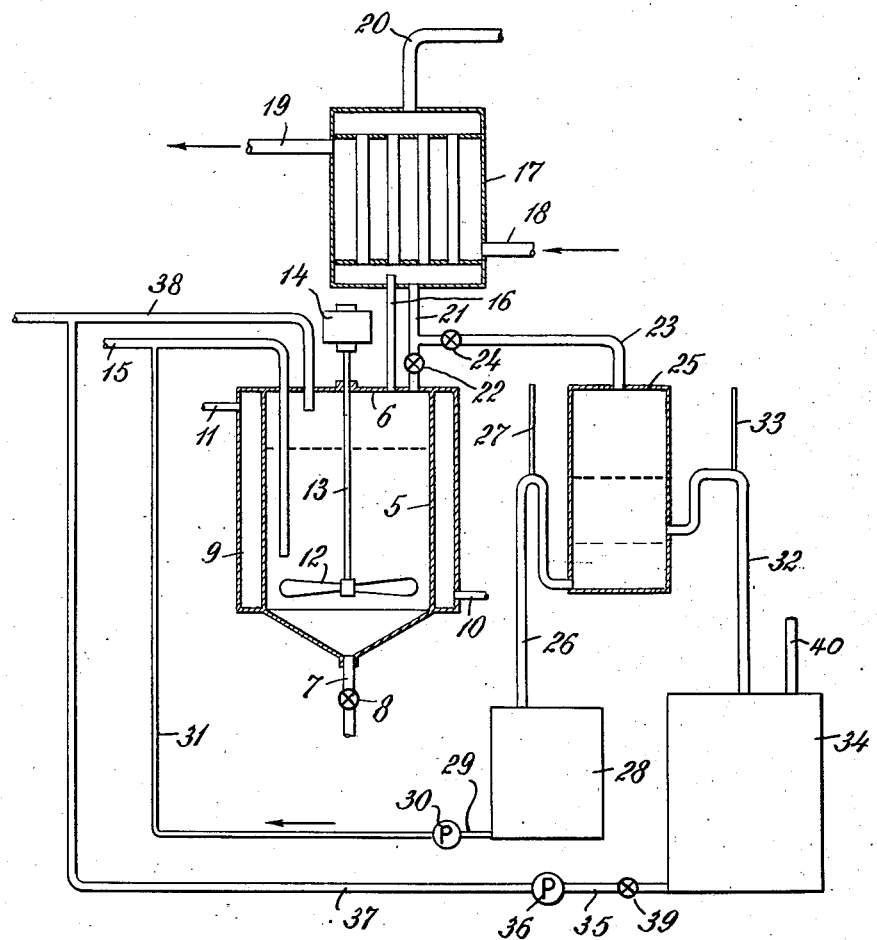
INVENTOR.
Frederick R. Balcar
BY
ATTORNEYS Patented Apr. 24, 1945

2,374,405

UNITED STATES PATENT OFFICE 2,374,405

PRODUCTION OF BUTADIENE

Frederick R. Balcar, Stamford, Conn., assignor to Air Reduction Company, Incorporated, New York, N. Y., a corporation of New York Application June 25, 1943, Serial No. 492,300

3 Claims. (Cl. 260—681)

This invention relates to the production of 1,3-butadiene from 1,3-butylene glycol and particularly to an improved method affording a commercially practicable procedure for the economical recovery of the desired product.

In an application of Arthur E. Lorch, Serial No. 477,939, a method of producing 1,3-butadiene is described. It involves the heating of 1,3-butylene glycol in relatively low concentrations in an inert liquid including a dehydration catalyst and in the absence of substantial amounts of water in the liquid phase. The procedure requires the maintenance of a body of a suitable liquid at a temperature favorable to the reaction, that is, within the range of 220° to 350° C., the preferred range being from 260° to 285° C. The catalyst may be suspended in the liquid. The glycol is introduced at substantially the rate at which conversion to butadiene occurs, so that no substantial amount of glycol remains at any time in the liquid. Suitable liquids for use in the method include diphenylethane, hexaethyl benzene, benzyl ether, a mixture of diphenyl and diphenyl oxide known as "Dowtherm," a refined petroleum product known as "Nujol," Texas Co. #531 wash oil, a topped fuel oil having a boiling point of 260°-270° C., Bunker C oil and a higher alcohol known to the trade as "cyclic C18 alcohol." The liquid selected with the suspended catalyst may be heated to the desired temperature by means of a jacket through which a heating liquid such as "Dowtherm" is circulated. It is agitated preferably to ensure adequate contact between the glycol and the catalyst.

The preferred catalyst is "ammonium phosphate," a term which is employed as a general designation of the tri, di and mono ammonium phosphates or mixtures of these salts. It includes also decomposition products of these phosphates which are subject to modification when subjected to temperatures such as those employed in the method. The precise composition of the resultant salt or salts in the catalyst mass at the temperature maintained cannot be determined accurately. Any of the phosphates mentioned or the resulting products are active catalysts for the reaction. Although "ammonium phosphate" is preferred, other catalysts may be employed.

In the operation of the method, the catalyst deteriorates after considerable use. It may be separated from the inert liquid by filtration or otherwise at intervals. A fresh catalyst can be added to the liquid which may be returned to the reactor for further use.

At longer intervals the liquid itself becomes contaminated. The exact nature of the contaminating impurities is not known, but the result is evidenced by the reduction of the yield of butadiene even when a fresh catalyst is added to the liquid. At this point, the liquid must be withdrawn from the system and replaced in order to restore the desired activity.

It is the object of the present invention to provide a procedure whereby the inert liquid can be purified continuously during the operation, thereby avoiding the necessity for withdrawing and discarding this material.

Other objects and advantages of the invention will be apparent as it is better understood by reference to the following specification and accompanying drawing, which illustrates diagrammatically an apparatus suitable for the practice of the procedure.

The invention depends upon the fact that during the formation of 1,3-butadiene in accordance with the method of application Ser. No. 477,939, a certain amount of the inert liquid is distilled and escapes from the reactor with the vapor which consists principally of butadiene. The inert liquid is normally condensed and returned directly to the reactor. It may, however, be withdrawn separately. The condensate has been found to be free from impurities which affect the reaction, and it can be returned, therefore, to the reactor, thus affording a fresh supply of liquid in a form satisfactory for the maintenance of the reaction.

The procedure will be readily understood by reference to the drawing which, as described, is merely illustrative of suitable equipment for the purpose. The reactor 5 is a receptacle having a closure 6 and an outlet 7 controlled by a valve 8. A heating jacket 9 is adapted to be supplied through a pipe 10 with a heating liquid which escapes through a pipe 11 and is reheated for circulation through the jacket. Any suitable heating liquid adapted to be maintained at the desired temperature may be employed. "Dowtherm" is well adapted for the purpose, since it may be maintained readily at the desired temperature to heat the body of liquid within the reactor 5. An agitator 12 is supported on the shaft 13 and is adapted to be driven from a suitable source such as a motor 14 to maintain the desired agitation during the reaction.

The reactor 5 is partially filled with the selected heating liquid in which the catalyst is suspended. Glycol is introduced through a pipe 15 from any suitable source of supply at substantially the rate of reaction. The glycol enters beneath the surface of the liquid in the reactor and immediately is raised to the temperature of the heating liquid while it is brought into contact with the catalyst. As the result, butadiene is produced and escapes together with water vapor formed as the result of the reaction, some unreacted glycol and vapor formed by vaporization of the heating liquid, through a pipe 16. The vapors pass to a condenser 17. Cooling water is supplied through a pipe 18 and escapes through a pipe 19. The condensate accumulates in the bottom of the condenser 17 and may overflow through an extension of the pipe 16 and thus return to the reactor. The butadiene vapors escape through a pipe 20 and may be subjected to any suitable treatment such as compression and cooling to afford a liquid product. A pipe 21 is connected to the bottom of the condenser 17 and to the top of the reactor 5. A valve 22 permits delivery to the condenser to the reactor when desired. A branch pipe 23 controlled by a valve 24 permits diversion of the condensate to a separator 25. In the separator, the liquid forms two layers, the lower of which consists of unreacted glycol. This may be withdrawn through a pipe 26 having a vent 27 and delivered to a storage receptacle 28. It may be delivered through a pipe 29, pump 30 and pipe 31 to the pipe 15 and thus returned to the reactor.

The upper layer consists of the distillate of the heating liquid employed in the reactor. As indicated, it is free from impurities which affect the reaction. It is withdrawn from the separator through a pipe 32 having a vent 33 and delivered to a storage receptacle 34. It may be delivered as required through a pipe 35, pump 36 and pipe 37 to a pipe 38 through which fresh heating liquid is introduced to the reactor. A valve 39 controls the delivery of the liquid from the receptacle 34.

The invention as described serves two important purposes: first, the conservation of the inert heating liquid by recovery of the portion which is vaporized during the reaction; and second, the provision of a constant source of this liquid free from impurities affecting the reaction, thus avoiding the necessity for withdrawing all of the liquid at intervals for replacement or elaborate treatment for purification. It is necessary at intervals to withdraw the liquid with the suspended catalyst through the pipe 7 in order to separate the catalyst therefrom and to add fresh or revivified catalyst to the reaction, as, for example, by introducing it through a pipe 40 into the storage receptacle 34 before the distillate therein is recycled to the reactor 5.

Various changes may be made in the procedure as described as well as in the apparatus employed without departing from the invention or sacrificing the advantages thereof.

I claim:

1. The method of producing 1,3-butadiene by dehydration of 1,3-butylene glycol which comprises feeding the glycol beneath the surface of a body consisting of an inert organic liquid carrier and a dehydrating catalyst at a temperature between 220° and 350° C., condensing from the vapor produced the portion of the liquid carrier which is vaporized, adding fresh catalyst to the liquid carrier, and returning it to the dehydration reaction.

2. The method of producing 1,3-butadiene by dehydration of 1,3-butylene glycol which comprises feeding the glycol beneath the surface of a body consisting of an inert organic liquid carrier and a dehydrating catalyst at a temperature between 220° and 350° C., condensing from the vapor produced the portion of the liquid carrier which is vaporized, and the unreacted glycol, returning the unreacted glycol to the dehydration reaction, adding fresh catalyst to the liquid carrier, and returning it to the dehydration reaction.

3. The method of producing 1,3-butadiene by dehydration of 1,3-butylene glycol which comprises feeding the glycol beneath the surface of a body consisting of an inert organic liquid carrier and a dehydrating catalyst at a temperature between 220° and 350° C., condensing from the vapor produced a portion of the liquid carrier which is vaporized, collecting the condensate and returning it at intervals for re-use as the inert liquid carrier.

FREDERICK R. BALCAR.